(12) United States Patent
Aketa et al.

(10) Patent No.: US 7,150,803 B2
(45) Date of Patent: *Dec. 19, 2006

(54) AIR BAG SEALER SILICONE RUBBER COMPOSITION

(75) Inventors: Takashi Aketa, Gunma-ken (JP); Hiroyasu Hara, Gunma-ken (JP); Yoshifumi Inoue, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 373 days.

This patent is subject to a terminal disclaimer.

(21) Appl. No.: 10/372,893

(22) Filed: Feb. 26, 2003

(65) Prior Publication Data
US 2003/0162875 A1   Aug. 28, 2003

(30) Foreign Application Priority Data
Feb. 28, 2002   (JP)   ............... 2002-053973

(51) Int. Cl.
C09J 117/02   (2006.01)

(52) U.S. Cl. ............ 156/329; 524/425; 528/31; 528/15

(58) Field of Classification Search ........... 528/13, 528/31; 156/329
See application file for complete search history.

(56) References Cited

U.S. PATENT DOCUMENTS

| | | |
|---|---|---|
| 3,159,601 A | 12/1964 | Ashby |
| 3,159,602 A | 12/1964 | Cheshire et al. |
| 3,220,972 A | 11/1965 | Lamoreaux |
| 3,755,452 A | 8/1973 | Sinn et al. |
| 4,889,576 A | 12/1989 | Suganuma et al. |
| 5,399,402 A | 3/1995 | Inoue et al. |
| 5,789,084 A | 8/1998 | Nakamura et al. |
| 5,877,256 A | 3/1999 | Nakamura et al. |
| 6,274,658 B1 * | 8/2001 | Hara ............... 524/288 |
| 6,387,520 B1 | 5/2002 | Fujiki et al. |
| 6,425,600 B1 | 7/2002 | Fujiki et al. |

FOREIGN PATENT DOCUMENTS

| | | |
|---|---|---|
| EP | 0 663 468 A1 | 7/1995 |
| EP | 0 866 164 A1 | 9/1998 |
| EP | 1 179 454 A2 | 2/2002 |
| EP | 1 225 211 A2 | 7/2002 |
| JP | 10-114860 A | 5/1998 |
| JP | 11-350361 A | 12/1999 |

* cited by examiner

Primary Examiner—Richard Crispino
Assistant Examiner—Chris Schatz
(74) Attorney, Agent, or Firm—Birch, Stewart, Kolasch & Birch, LLP

(57) ABSTRACT

When an air bag is prepared by laying a pair of silicone rubber-impregnated and/or coated base fabric pieces one on the other, with the coated surfaces of the pieces inside, and joining peripheral portions of the pieces together to form a bag, an addition reaction curing type silicone rubber composition which cures into a silicone rubber having an elongation at break of at least 1000% is used as a sealer and applied to the peripheral portions of the base fabric pieces, thereby achieving improved adhesion therebetween.

17 Claims, 1 Drawing Sheet

AIR BAG SEALER SILICONE RUBBER COMPOSITION

TECHNICAL FIELD

This invention relates to a process of preparing an air bag by laying a pair of base fabric pieces impregnated and/or coated with silicone rubber one on the other, with the coated surfaces of the pieces inside, and joining peripheral portions of the pieces together to form a bag, and more particularly, to a silicone rubber composition for use as a sealer to be applied to the peripheral portions of the base fabric pieces prior to joining.

BACKGROUND OF THE INVENTION

One typical process for preparing an air bag involves the steps of furnishing a pair of base fabric pieces impregnated and/or coated with silicone rubber, laying the pieces one on the other, with the coated surfaces of the pieces inside, and bonding or stitching peripheral portions of the pieces together to form a bag. An attempt has been made to apply an adhesive silicone rubber composition as a sealer to the peripheral portions of the base fabric pieces prior to bonding or stitching. With the state of the art, it is very difficult to bond an uncured silicone rubber composition to once cured silicone rubber.

SUMMARY OF THE INVENTION

An object of the present invention is to provide, in connection with the aforementioned air bag preparation process, a silicone rubber composition which is applicable as a sealer to the peripheral portions of the silicone rubber-coated base fabric pieces prior to bonding or stitching and develops good adherence thereto.

In connection with a process of preparing an air bag by laying a pair of base fabric pieces impregnated and/or coated with silicone rubber one on the other, with the coated surfaces of the pieces inside, and bonding or stitching peripheral portions of the pieces together to form a bag, the present invention provides an addition reaction curing type silicone rubber composition which cures into a silicone rubber having an elongation at break of at least 1000%. Preferably a calcium carbonate powder is added to the composition. The silicone rubber composition is suited for use as a sealer to be applied to the peripheral portions of the base fabric pieces prior to bonding or stitching and develops good adherence to the base fabric pieces.

DETAILED DESCRIPTION OF THE INVENTION

Figure 1:
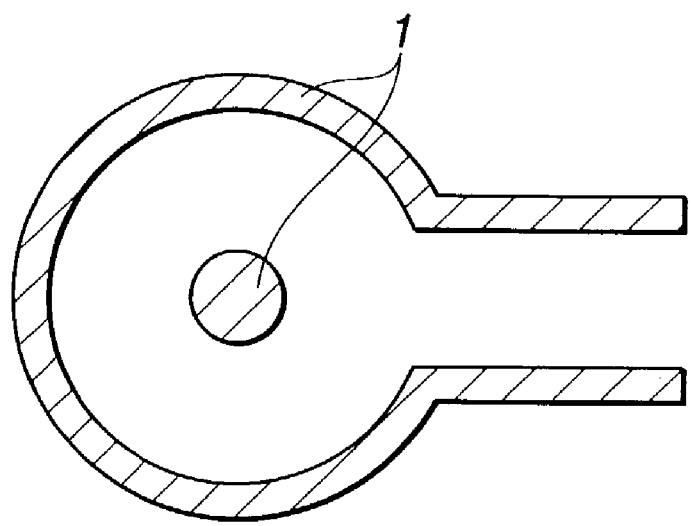
FIG. 1 illustrates an inflation test for adherence evaluation where an adhesive silicone rubber composition is applied to a base fabric piece in a pattern to form a bag.

The present invention relates to a process for preparing an air bag by furnishing a pair of base fabric pieces impregnated and/or coated with silicone rubber, laying the pieces one on the other, with the coated surfaces of the pieces faced inside, and bonding or stitching peripheral portions of the pieces together to form a bag. The silicone rubber composition of the present invention is used as a sealer, that is, applied to the peripheral portions of the base fabric pieces prior to the bonding or stitching step for establishing a firm bond between the peripheral portions after the bonding or stitching step. Thus the bonded or stitched portions are tightly sealed.

The type of base fabric, the type of silicone rubber composition affording the silicone rubber with which the base fabric is impregnated and/or coated (including curable silicone rubber compositions of different types, for example, organic peroxide curing type, addition reaction curing type, condensation reaction curing type, and UV curing type), and the impregnating or coating method (for example, coating, imprinting, screen printing and dipping) may be well-known types or methods. Namely, any desired base fabric can be impregnated or coated with any desired silicone rubber composition by well-known means.

The air bag sealer silicone rubber composition of the present invention is a silicone rubber composition of the addition reaction curing type which cures into a silicone rubber having an elongation at break of at least 1,000%, desirably at least 1,200% and more desirably at least 1,400%. The upper limit of elongation is usually up to 2,500%, desirably up to 2,000%, though not critical.

The elongation at break is measured by the following method. A cured silicone rubber sheet of 1 mm thick was punched using a dumbbell cutter according to ASTM D1822L. The dumbbell specimen is marked with gages spaced apart 1 cm. With one end of the dumbbell secured, the other end is pulled at a constant rate of 300 mm/min until the dumbbell specimen is broken. A percent elongation at this point is determined.

A preferred embodiment is an addition reaction curing type silicone rubber composition comprising (i) an organopolysiloxane containing at least two alkenyl radicals in a molecule, (ii) an organohydrogenpolysiloxane containing at least two silicon atom-bonded hydrogen atoms in a molecule, and (iii) a platinum group metal catalyst. Desirably the composition further contains (iv) an organopolysiloxane resin having siloxane units containing alkenyl radicals and siloxane units of the formula: $SiO_{4/2}$ in a molecule, and more desirably (v) an alkoxysilane or a partial hydrolytic condensate thereof. In any of these preferred compositions, inclusion of (vi) a calcium carbonate powder is recommended. These components are described in more detail.

(i) Alkenyl-containing Organopolysiloxane

The alkenyl-containing organopolysiloxane used herein is a base polymer in the silicone rubber composition and should contain at least two alkenyl radicals in a molecule. Most often, it is a linear one whose backbone consists essentially of recurring diorganosiloxane units and which is blocked with a triorganosiloxy radical at each end of its molecular chain. It may contain a branched structure in part in its molecular structure or even be cyclic. From the standpoint of mechanical strength and other physical properties of the cured product, a linear diorganopolysiloxane is preferred. The alkenyl radicals may be attached only at the ends of the molecular chain or at the ends and intermediates of the molecular chain. Typically, the alkenyl-containing diorganopolysiloxane are represented by the general formula (1):

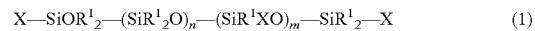

wherein $R^1$ is independently a substituted or unsubstituted monovalent hydrocarbon radical free of aliphatic unsaturation, X is an alkenyl radical, n is 0 or an integer of at least 1, m is 0 or an integer of at least 1. The unit "m" (SiR$^1$XO) and the unit "n" (SiR$^1{}_2$O) are arranged at random.

Examples of suitable substituted or unsubstituted monovalent hydrocarbon radicals free of aliphatic unsaturation represented by R$^1$ include alkyl radicals such as methyl, ethyl, propyl, isopropyl, butyl, isobutyl, tert-butyl, pentyl, neopentyl, hexyl, heptyl, octyl, nonyl, decyl and dodecyl; cycloalkyl radicals such as cyclopentyl, cyclohexyl and cycloheptyl; aryl radicals such as phenyl, tolyl, xylyl, naphthyl and biphenylyl; aralkyl radicals such as benzyl, phenylethyl, phenylpropyl and methylbenzyl; and substituted radicals of the foregoing in which some or all of the carbon atom-bonded hydrogen atoms are substituted with halogen atoms (e.g., fluoro, chloro, bromo), cyano radicals or the like, such as chloromethyl, 2-bromoethyl, 3-chloropropyl, 3,3,3-trifluoropropyl, chlorophenyl, fluorophenyl, cyanoethyl and 3,3,4,4,5,5,6,6,6-nonafluorohexyl. Those radicals having 1 to 10 carbon atoms, especially 1 to 6 carbon atoms are typical. Of these, preferred are substituted or unsubstituted alkyl radicals having 1 to 3 carbon atoms such as methyl, ethyl, propyl, chloromethyl, bromoethyl, 3,3,3-trifluoropropyl and cyanoethyl and substituted or unsubstituted phenyl radicals such as phenyl, chlorophenyl and fluorophenyl.

Examples of suitable alkenyl radicals represented by X include those having about 2 to about 8 carbon atoms such as vinyl, allyl, propenyl, isopropenyl, butenyl, hexenyl and cyclohexenyl, with lower alkenyl radicals such as vinyl and allyl being preferred.

In formula (1), n is an integer of 0, 1 or greater, m is an integer of 0, 1 or greater. Preferably n and m are integers satisfying $10 \leq n+m \leq 10,000$, and more preferably $50 \leq n+m \leq 2,000$ and $0 \leq m/(n+m) \leq 0.2$.

These alkenyl-containing diorganopolysiloxanes should preferably have a viscosity of 10 to 1,000,000 cSt at 25° C., more preferably 100 to 500,000 cSt at 25° C.

(ii) Organohydrogenpolysiloxane

The organohydrogenpolysiloxane serves as a crosslinking agent and contains at least two, preferably at least three hydrogen atoms each attached to a silicon atom (i.e., SiH radicals) in a molecule. The organohydrogenpolysiloxane may have a linear, branched or cyclic structure or be a resinous one having three-dimensional network structure. The upper limit of the number of SiH radicals in one molecule is usually about 300 or less, preferably about 100 or less, though not critical. The organohydrogenpolysiloxane desirably has a degree of polymerization of about 2 to about 300, more desirably about 3 to about 150 (which corresponds to the number of silicon atoms per molecule). It is noted that the SiH radicals may be positioned at the end or an intermediate of the molecular chain or both.

Most often, the organohydrogenpolysiloxane (C) is represented by the following average compositional formula (2).

$$H_a R^2{}_b SiO_{(4-a-b)/2} \qquad (2)$$

In formula (2), R$^2$ is independently a substituted or unsubstituted monovalent hydrocarbon radical free of aliphatic unsaturation, "a" and "b" are numbers satisfying $0<a<2$, $0.8 \leq b \leq 2$ and $0.8<a+b \leq 3$, preferably $0.01 \leq a \leq 1$, $1 \leq b \leq 2$ and $1.01 \leq a+b \leq 3$, and more preferably $0.05 \leq a \leq 1$, $1.5 \leq b \leq 2$ and $1.8 \leq a+b \leq 2.7$.

Examples of suitable substituted or unsubstituted monovalent hydrocarbon radicals free of aliphatic unsaturation represented by R$^2$ are as exemplified for R$^1$ in formula (1). Monovalent hydrocarbon radicals having 1 to 10 carbon atoms, especially 1 to 7 carbon atoms are typical. Of these, lower alkyl radicals having 1 to 3 carbon atoms such as methyl and 3,3,3-trifluoropropyl are preferred as well as phenyl.

Examples of the organohydrogenpolysiloxane include siloxane oligomers such as 1,1,3,3-tetramethyldisiloxane, 1,3,5,7-tetramethyltetracyclosiloxane, and 1,3,5,7,8-pentamethylpentacyclosiloxane; both end trimethylsiloxy-blocked methylhydrogenpolysiloxane, both end trimethylsiloxy-blocked dimethylsiloxane-methylhydrogensiloxane copolymers, both end silanol-blocked methylhydrogenpolysiloxane, both end silanol-blocked dimethylsiloxane-methylhydrogensiloxane copolymers, both end dimethylhydrogensiloxy-blocked dimethylpolysiloxane, both end dimethylhydrogensiloxy-blocked methylhydrogenpolysiloxane, both end dimethylhydrogensiloxy-blocked dimethylsiloxane-methylhydrogensiloxane copolymers; and silicone resins comprising R$_2$(H)SiO$_{1/2}$ units and SiO$_{4/2}$ units and optionally, RSiO$_{3/2}$ units, R$_2$SiO$_{2/2}$ units, R(H)SiO$_{2/2}$ units, (H)SiO$_{3/2}$ units or RSiO$_{3/2}$ units wherein R is a substituted or unsubstituted monovalent hydrocarbon radical as exemplified above for R$^1$. Also included are those represented by the following formulae.

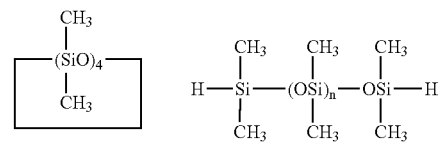

n is an integer of 1 to 50.

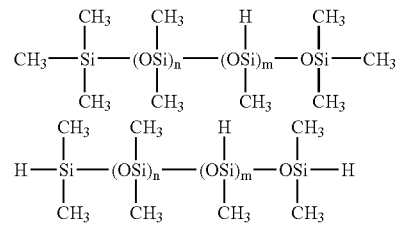

n is an integer of 0 to 40, m is an integer of 2 to 40, m+n=2 to 80.

The unit "m" (Osi) and the unit "n" (Osi) are arranged at random.

The organohydrogenpolysiloxane used herein can be prepared by well-known methods, for example, by co-hydrolyzing at least one chlorosilane selected from the general formulae: R$^2$SiHCl$_2$ and R$^2{}_2$SiHCl wherein R$^2$ is as defined above, or by co-hydrolyzing a mixture of the foregoing chlorosilane and at least one chlorosilane selected from the general formulae: R$^2{}_3$SiCl and R$^2{}_2$SiCl$_2$ wherein R$^2$ is as defined above. If desired, the polysiloxane resulting from such cohydrolysis is further subjected to equilibration reaction, resulting in an organohydrogenpolysiloxane which is also useful.

Component (ii) is preferably used in such amounts that 0.5 to 4 moles, more preferably 0.8 to 2.5 moles of silicon atom-bonded hydrogen atoms (i.e., SiH radicals) in the organohydrogenpolysiloxane (ii) are present per mole of alkenyl radicals in the alkenyl-containing organopolysiloxane (i) or in components (i) and (iv) combined if component (iv) to be described later has alkenyl radicals such as vinyl.

(iii) Platinum Group Metal Catalyst

The platinum group metal catalyst used herein is a catalyst for promoting the addition reaction between alkenyl groups in component (i) and silicon atom-bonded hydrogen atoms in component (ii). Well-known catalysts used in hydrosilylation reaction are useful. Exemplary catalysts are platinum, palladium and rhodium base catalysts including elemental platinum group metals such as platinum (inclusive of platinum black), rhodium and palladium; platinum chloride, chloroplatinic acid and chloroplatinic acid salts such as $H_2PtCl_4 \cdot nH_2O$, $H_2PtCl_6 \cdot nH_2O$, $NaHPtCl_6 \cdot nH_2O$, $KHPtCl_6 \cdot nH_2O$, $Na_2PtCl_6 \cdot nH_2O$, $K_2PtCl_4 \cdot nH_2O$, $PtCl_4 \cdot nH_2O$, $PtCl_2$ and $Na_2HPtCl_4 \cdot nH_2O$ wherein n is an integer of 0 to 6, preferably 0 or 6; alcohol-modified chloroplatinic acid (see U.S. Pat. No. 3,220,972); complexes of chloroplatinic acid with olefins (see U.S. Pat. Nos. 3,159,601, 3,159,662 and 3,775,452); platinum group metals such as platinum black and palladium on carriers such as alumina, silica and carbon; rhodium-olefin complexes; chlorotris (triphenylphosphine)rhodium (known as Wilkinson catalyst); and complexes of platinum chloride, chloroplatinic acid or chloroplatinic acid salts with vinyl-containing siloxanes, especially vinyl-containing cyclic siloxanes.

The catalyst (iii) is used in a catalytic amount, typically about 0.1 to 1,000 parts, preferably about 0.1 to 500 parts, and more preferably about 0.5 to 200 parts by weight of platinum group metal per million parts by weight of components (i) and (ii) combined.

(iv) Organopolysiloxane Resin

Preferably, an organopolysiloxane resin is added to the silicone rubber composition. It is an organopolysiloxane resin of three-dimensional network structure containing essentially branched units represented by $SiO_2$ units and/or $RSiO_{3/2}$ units, and optionally, $R_3SiO_{1/2}$ units and/or $R_2SiO$ units wherein R is a monovalent hydrocarbon radical such as alkyl, alkenyl or aryl. Inclusion of this organopolysiloxane resin increases the strength of silicone rubber. Exemplary organopolysiloxane resins are resins consisting of $(CH_3)_3SiO_{1/2}$ units and $SiO_{4/2}$ units, resins consisting of $(CH_3)_3SiO_{1/2}$ units, $(CH_2=CH)(CH_3)_2SiO_{1/2}$ units and $SiO_2$ units, resins consisting of $(CH_3)_3SiO_{1/2}$ units, $(CH_2=CH)SiO_{3/2}$ units and $SiO_{4/2}$ units, resins consisting of $(CH_2=CH)(CH_3)_2SiO_{1/2}$ units and $SiO_{4/2}$ units, and resins consisting of $(CH_2=CH)(CH_3)_2SiO_{1/2}$ units, $(CH_2=CH)SiO_{3/2}$ units and $SiO_{4/2}$ units. In particular, those resins having alkenyl radicals, typically vinyl are effective for improving the strength of the compositions when they are incorporated into the crosslinked structure.

The organopolysiloxane resin (iv) is preferably blended in amounts of about 0.01 to 30 parts by weight, more preferably about 0.1 to 15 parts by weight per 100 parts by weight of the alkenyl-containing organopolysiloxane (i).

(v) Alkoxysilane or Partial Hydrolytic Condensate

Suitable alkoxysilanes and partial hydrolytic condensates thereof are tetrafunctional alkoxysilanes including tetraalkoxysilanes such as tetramethoxysilane and tetraethoxysilane; and trifunctional alkoxysilanes including organotrialkoxysilanes, typically alkyltrialkoxysilanes, alkenyltrialkoxysilanes and aryltrialkoxysilanes such as methyltrimethoxysilane, methyltriethoxysilane, ethyltrimethoxysilane, vinyltrimethoxysilane, phenyltrimethoxysilane, and methyltri(methoxyethoxy)silane, and alkoxysilanes having epoxy or amino-containing substituent groups such as γ-glycidoxypropyltrialkoxysilanes and γ-aminopropyltriethoxysilane, and partial hydrolytic condensates of the foregoing. They may be used alone or in admixture of two or more.

The alkoxysilane or partial hydrolytic condensate thereof (v) is preferably blended in amounts of about 0.1 to 10 parts by weight, more preferably about 0.5 to 5 parts by weight per 100 parts by weight of component (i).

(vi) Calcium Carbonate Powder

Calcium carbonate ($CaCO_3$) powder is preferably blended in the inventive silicone rubber composition because the silicone rubber is improved in elongation at break and adherence.

The calcium carbonate powder used herein may be selected from well-known ones such as heavy calcium carbonate (i.e., calcium carbonate fine powder obtained by wet or dry pulverizing method.) and colloidal calcium carbonate (i.e., calcium carbonate fine powder obtained by sedimentation method.). It may or may not be surface treated with resins or fatty acids. From the standpoints of fluidity and reinforcement, calcium carbonate powder having an average particle size of 0.01 to 50 μm, preferably 0.02 to 50 μm, more preferably 0.03 to 10 μm. The average particle size is determined as a weight average value $D_{50}$ or median diameter in particle size distribution measurement by the laser light diffraction method.

The calcium carbonate powder generally retains some moisture. Moisture may be removed if desired. Moisture removal is carried out, for example, by mixing a dimethylpolysiloxane with calcium carbonate powder and heat treating the mixture. The heating temperature is usually 50° C. or higher, preferably 80 to 200° C., and a reduced pressure may be employed for promoting the heat treatment. By this heat treatment, the calcium carbonate powder which has not been surface treated is substantially treated with the dimethylpolysiloxane whereby the moisture is released. When the addition reaction curing type silicone rubber composition is loaded with such dry calcium carbonate powder, the composition can be stabilized without chemically altering the organohydrogenpolysiloxane (ii).

The calcium carbonate powder (vi) is preferably blended in amounts of about 0.01 to 100 parts by weight, more preferably about 0.1 to 50 parts by weight per 100 parts by weight of component (i).

Other Components

In addition to the above-described components (i) to (vi), there may be added to the inventive composition reinforcing inorganic fillers such as fumed silica and fumed titanium dioxide; reinforcing silicone resins; and non-reinforcing inorganic fillers such as calcium silicate, titanium dioxide, ferric oxide, and carbon black. These inorganic fillers are generally used in amounts of 0 to 200 parts by weight per 100 parts by weight of all the components excluding the inorganic fillers. It is also acceptable to add organic titanium compounds such as titanium chelates and organic titanic acid esters. The organic titanium compounds are generally used in amounts of 0 to 10 parts by weight, preferably 0.1 to 5 parts by weight per 100 parts by weight of all the components excluding the inorganic fillers.

Curable Silicone Rubber Composition and Cured Product

Like conventional curable silicone rubber compositions, the inventive composition may be formulated as a two part composition wherein two parts are kept separate and on use, mixed together for curing. Independent of whether the inventive composition is one part type or two part type, an epoxy radical-containing polysiloxane compound or ester siloxane compound may be additionally included in the composition if desired for improving the adhesion of the composition. The resulting composition is also improved in flow.

Under the same conditions as used for well-known addition reaction curing type silicone rubber compositions, the inventive composition can be cured. For example, the inventive composition cures satisfactorily at room temperature, but can be heated for curing if desired.

EXAMPLE

Examples of the invention are given below by way of illustration and not by way of limitation.

Examples 1–4 & Comparative Examples 1–2

Using the components described below, silicone rubber compositions of the formulation shown in Table 1 were prepared. The compositions were evaluated by several tests, with the results shown in Table 1.

Components (A-1) Untreated calcium carbonate Whiton SSB by Shiraishi Kogyo Co., Ltd., average particle size 1.5 μm (A-2) Surface treated calcium carbonate Calex 300 by Maruo Calcium Co., Ltd. average particle size 0.04 μm surface treating agent: higher fatty acid (a mixture of lauric acid, myristic acid, palmitic acid, oleic acid and stearic acid)

(B) Organopolysiloxane Vinyl-containing linear organopolysiloxane represented by the formula:

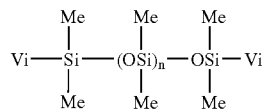

wherein Me is methyl, Vi is vinyl, and n is such a number that the siloxane has a viscosity of 100,000 cSt at 25° C.

(C-1) Organohydrogenpolysiloxane

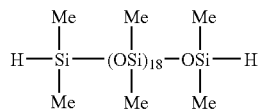

(C-2) Organohydrogenpolysiloxane

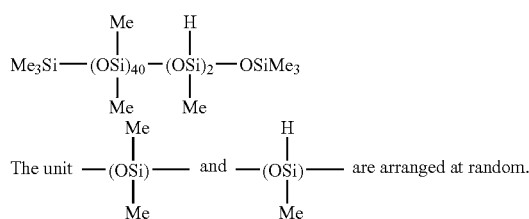

(D) Platinum group metal catalyst platinum-divinyltetramethyldisiloxane complex in toluene (Pt content 0.5 wt %)

(E) Reinforcing resin vinyl-containing methylpolysiloxane resin composed of $Vi(Me)_2SiO_{1/2}$ units and $SiO_{4/2}$ units (F) Alkoxysilane or partial hydrolytic condensate phenyltrimethoxysilane KBM103 by Shin-Etsu Chemical Co., Ltd.

(G) Reinforcing inorganic filler fumed silica treated with dimethylpolysiloxane and hexamethyldisilazane (H) Cure controlling agent 50% ethynyl cyclohexanol in toluene (I) Organotitanium $Ti[OCH_2CH(C_2H_5)(CH_2)_3CH_3]_4$ Runs were carried out using the foregoing components. Components (A) and (B) were mixed. The mixture was heat treated at 150° C. for 2 hours under a reduced pressure. After cooling to room temperature, the mixture was compounded with components (C), (D), (E), (F), (G), (H) and (I) under a reduced pressure, yielding an adhesive silicone rubber composition.

Tests

Peel Test and Cohesive Failure:

Two fabric pieces coated with silicone rubber were mated together, with the coated surfaces faced inside. At this point, the adhesive silicone rubber composition was applied therebetween to a thickness of 0.5 mm. After the silicone rubber composition was cured, the fabric pieces were peeled apart using a testing machine Strograph (Toyo Seiki Seisaku-sho, Ltd.). A peel adhesion strength (N/cm) was measured and a percent cohesive failure at the adhesion interface was computed.

Elongation at Break:

The adhesive silicone rubber composition was cured into a silicone rubber sheet of 1 mm thick, which was punched using a dumbbell cutter according to ASTM D1822L. The dumbbell specimen was marked with gages spaced apart 1 cm. With one end of the dumbbell secured, the other end was pulled at a constant rate of 300 mm/min until the dumbbell specimen was broken. A percent elongation at break was determined.

Figure 2:
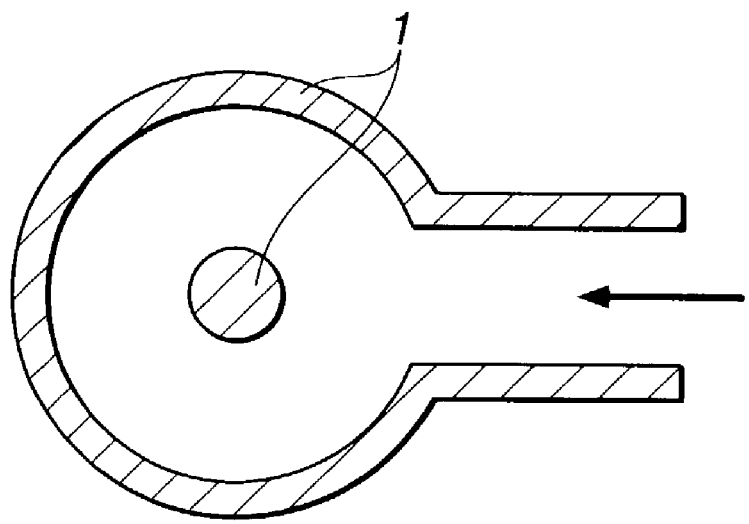
FIG. 2 illustrates how to inject air into the bag.

Inflation Test Adhesion:

A test was carried out according to the actual usage of an air bag. Fabric pieces surface coated with silicone rubber were furnished. On the rubber-coated surface of one fabric piece, the uncured adhesive silicone rubber composition I was applied in the hatched pattern shown in FIG. 1. The other fabric piece was laid thereon, with the rubber-coated surface faced inside. The assembly was held at 23° C. for one day for curing whereby the fabric pieces were joined to form a bag. Air under 7 atmospheres was injected into the bag for 0.5 second from the open end as shown by the arrow in FIG. 2. The bonded state of the adhesive silicone rubber composition was observed. It was rated OK when cohesive failure occurred, and NG when interfacial peeling occurred. It is understood that FIGS. 1 and 2 are plan views of an air bag as viewed from above.

TABLE 1

| Components (pbw) | Comparative Example | | Example | | | |
|---|---|---|---|---|---|---|
| | 1 | 2 | 1 | 2 | 3 | 4 |
| A-1 | 0 | 0 | 35 | 25 | 20 | 0 |
| A-2 | 0 | 0 | 0 | 0 | 0 | 20 |

TABLE 1-continued

| Components (pbw) | Comparative Example 1 | 2 | Example 1 | 2 | 3 | 4 |
|---|---|---|---|---|---|---|
| B | 94 | 94 | 94 | 94 | 94 | 94 |
| C-1 | 1.9 | 1.9 | 1.9 | 1.9 | 1.9 | 1.9 |
| C-2 | 8.7 | 8.7 | 8.7 | 8.7 | 8.7 | 8.7 |
| D | 0.5 | 0.5 | 0.5 | 0.5 | 0.5 | 0.5 |
| E | 7.5 | 7.5 | 7.5 | 7.5 | 7.5 | 7.5 |
| F | 1 | 1 | 1 | 1 | 1 | 1 |
| G | 21 | 30 | 21 | 21 | 21 | 21 |
| H | 0 | 0 | 0.15 | 0.15 | 0.15 | 0.15 |
| I | 0.5 | 0.5 | 0.5 | 0.5 | 0.5 | 0.5 |
| Peel strength (N/cm) | 2.0 | 2.7 | 6.0 | 6.3 | 4.7 | 5.0 |
| Cohesive failure (%) | 20 | 80 | 100 | 100 | 100 | 100 |
| Elongation at break (%) | 800 | 850 | 1100 | 1300 | 1400 | 1450 |
| Inflation test adhesion | NG | NG | OK | OK | OK | OK |

In Comparative Examples 1 and 2, calcium carbonate was not added. Comparative Example 1 contained a less amount of the reinforcing inorganic filler than Comparative Example 2. Comparative Example 2 containing a more amount of the reinforcing inorganic filler developed better adhesion than Comparative Example 1, but not to a satisfactory extent.

Examples 1 to 3 contained different amounts of untreated calcium carbonate, which gave satisfactory results including a cohesive failure of 100%. Satisfactory adhesion was developed even when the amount of calcium carbonate was reduced. Examples 3 and 4 contained the same amount of untreated calcium carbonate and treated calcium carbonate, respectively. No difference in adhesion was found whether the calcium carbonate had been treated or not.

When silicone rubber-impregnated and/or coated fabric pieces are mated, with their coated surfaces inside, and joined along a periphery to form a bag, the adhesive silicone rubber compositions of Examples having surface-treated or untreated calcium carbonate added thereto are used as a sealer where the peripheral portions of the fabric pieces are joined together whereby an improved bond is established between the peripheral portions of the fabric pieces.

In an air bag prepared by laying a pair of base fabric pieces impregnated and/or coated with silicone rubber one on the other, with the coated surfaces of the pieces inside, and bonding or stitching peripheral portions of the pieces together to form a bag, the silicone rubber composition of the invention is used as a sealer and applied to the peripheral portions of the base fabric pieces, thereby achieving improved adhesion therebetween.

Japanese Patent Application No. 2002-053973 is incorporated herein by reference.

Reasonable modifications and variations are possible from the foregoing disclosure without departing from either the spirit or scope of the present invention as defined by the claims.

The invention claimed is:

1. A process of preparing an air bag, said process comprising:
   laying a pair of base fabric pieces impregnated and/or coated with silicone rubber one on the other, with the coated surfaces of the pieces inside;
   applying as a sealer an addition reaction curing type silicon rubber composition to peripheral portions of the base fabric pieces to be bonded or stitched; and
   bonding or stitching peripheral portions of the pieces together to form a bag, said addition reaction curing type silicone rubber composition comprising:
   (i) an organopolysiloxane containing at least two alkenyl radicals in a molecule;
   (ii) an organohydrogenpolysiloxane containing at least two silicon atom-bonded hydrogen atoms in a molecule;
   (iii) a platinum group metal catalyst;
   (v) an alkoxysilane or a partial hydrolytic condensate thereof,
   (vi) calcium carbonate powder; and
   (vii) an organic titanium compound;
   the composition curing into a silicone rubber having an elongation at break of at least 1000%.

2. The process of claim 1 wherein the calcium carbonate powder has been surface treated.

3. The process of claim 1 wherein the calcium carbonate powder has an average particle size of 0.01 to 50 μm.

4. The process of claim 1 wherein the addition reaction curing
   type silicone rubber composition further comprises
   (iv) an organopolysiloxane resin having siloxane units containing alkenyl radicals and siloxane units of the formula: $SiO_{4/2}$ in a molecule.

5. The process of claim 1 wherein the organopolysiloxane (i) contains at least two alkenyl radicals in each molecule.

6. The process of claim 1 wherein the organopolysiloxane (i) is a linear molecule whose backbone consists essentially of recurring di-organosiloxane units and which is blocked with a tri-organosiloxy radical at each end of its molecular chain.

7. The process of claim 1 wherein the organopolysiloxane (i) is that of formula (1):

$$X-SiOR^1{}_2-(SiR^1{}_2O)_n-(SiR^1XO)_m-SiR^1{}_2-X \quad (1)$$

wherein $R^1$ is independently a substituted or unsubstituted monovalent hydrocarbon radical free of aliphatic unsaturation, X is an alkenyl radical, n is 0 or an integer of at least 1, m is 0 or an integer of at least 1; the units "m" of $SiR^1XO$ are arranged at random; and the units "n" of $SiR^1{}_2O$ are arranged at random.

8. The process of claim 1 wherein the organohydrogenpolysiloxane (ii) contains at least two, hydrogen atoms each attached to a silicon atom in the molecule.

9. The process of claim 1 wherein the organohydrogenpolysiloxane (ii) is linear, branched, cyclic or resinous.

10. The process of claim 1 wherein the organohydrogenpolysiloxane (ii) has a degree of polymerization of about 2 to about 300.

11. The process of claim 1 wherein the organohydrogenpolysiloxane (ii) is that of formula (2)

$$H_aR^2{}_bSiO_{(4-a-b)/2} \quad (2)$$

wherein each $R^2$ is independently a substituted or unsubstituted monovalent hydrocarbon radical free of aliphatic unsaturation; "a" and "b" are numbers satisfying the relationship: $0<a<2$, $0.8 \leq b \leq 2$ and $0.8<a+b \leq 3$.

12. The process of claim 1 wherein the platinum group metal catalyst (iii) comprises platinum, palladium and/or rhodium.

13. The process of claim 1 wherein the platinum group metal catalyst (iii) is selected from the group consisting of elemental platinum, elemental rhodium, elemental palladium, mixtures and alloys thereof.

14. The process of claim 1 wherein the platinum group metal catalyst (iii) is selected from the group consisting of platinum chloride; chloroplatinic acid; $H_2PtCl_4 \cdot nH_2O$; $H_2PtCl_6 \cdot nH_2O$; $NaHPtCl_6 \cdot nH_2O$; $KHPtCl_6 \cdot nH_2O$; $Na_2PtCl_6 \cdot nH_2O$; $K_2PtCl_4 \cdot nH_2O$; $PtCl_4 \cdot nH_2O$; $PtCl_2$; $Na_2HPtCl_4 \cdot nH_2O$ wherein n is an integer of 0 to 6; and mixtures thereof.

15. The process of claim 1 wherein the platinum group metal catalyst (iii) wherein the catalyst is present in an amount equal to about 0.1 to 1,000 parts by weight of catalyst per million parts by weight of components (i) and (ii) combined.

16. The process of claim 1 wherein the alkoxysilane (v) is selected from the group consisting of alkyltrialkoxysilanes; alkenyltrialkoxysilanes; methyltrimethoxysilane; methyltriethoxysilane; ethyltrimethoxysilane; vinyltrimethoxysilane; phenyltrimethoxysilane; methyltri(methoxyethoxy)silane; alkoxysilanes and mixtures thereof.

17. The process of claim 1, wherein the alkoxysilane or a partial hydrolytic condensate thereof is at least one member selected from the group consisting of tetraalkoxysilanes, alkyltrialkoxysilanes, alkenyltrialkoxysilanes, aryltrialkoxysilanes, alkoxysilanes having epoxy- or amino-containing substituent groups, and partial hydrolytic condensates thereof.

* * * * *